United States Patent
Atsumi et al.

(10) Patent No.: US 12,103,594 B2
(45) Date of Patent: Oct. 1, 2024

(54) VEHICLE

(71) Applicants: TOYOTA JIDOSHA KABUSHIKI KAISHA, Toyota (JP); SUBARU CORPORATION, Tokyo (JP)

(72) Inventors: Hyuga Atsumi, Nagoya (JP); Masayoshi Iwase, Toyota (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 250 days.

(21) Appl. No.: 17/876,030

(22) Filed: Jul. 28, 2022

(65) Prior Publication Data

US 2023/0072159 A1 Mar. 9, 2023

(30) Foreign Application Priority Data

Sep. 9, 2021 (JP) .................. 2021-146845

(51) Int. Cl.
*B62D 25/14* (2006.01)
*B60K 1/04* (2019.01)

(52) U.S. Cl.
CPC .............. *B62D 25/145* (2013.01); *B60K 1/04* (2013.01); *B60K 2001/0411* (2013.01)

(58) Field of Classification Search
CPC ...... B62D 25/145; B62D 25/14; B62D 27/02; B62D 27/065; B62D 25/2018; B60K 1/04; B60K 2001/0411; B60K 2001/0438; B60Y 2306/01
See application file for complete search history.

(56) References Cited

U.S. PATENT DOCUMENTS

| | | | |
|---|---|---|---|
| 2015/0145284 A1 | 5/2015 | Nishida et al. | |
| 2015/0232127 A1* | 8/2015 | Atsumi | B62D 25/2045 296/187.08 |
| 2016/0001817 A1 | 1/2016 | Atsumi et al. | |
| 2016/0052561 A1* | 2/2016 | Atsumi | B62D 25/2018 296/187.08 |
| 2016/0137228 A1* | 5/2016 | Atsumi | B62D 21/02 296/204 |
| 2018/0065676 A1* | 3/2018 | Yoshida | B62D 25/20 |

FOREIGN PATENT DOCUMENTS

| | | | | |
|---|---|---|---|---|
| CN | 206475940 U | * | 9/2017 | ............... B60K 1/04 |
| EP | 3613656 A1 | * | 2/2020 | ........... B21C 23/002 |
| JP | H07-144660 A | | 6/1995 | |
| JP | 2015-101217 A | | 6/2015 | |
| JP | 2016-016692 A | | 2/2016 | |
| JP | 2017-226353 A | | 12/2017 | |

(Continued)

*Primary Examiner* — Lori Lyjak
(74) *Attorney, Agent, or Firm* — Dinsmore & Shohl LLP

(57) ABSTRACT

A vehicle includes a dash cross member extending along a vehicle width direction, a front side member arranged in front of the dash cross member and joined to the dash cross member, a floor member arranged behind the dash cross member, and a brace joined to the dash cross member and joined to the floor member. A joint between the brace and the dash cross member overlaps a joint between the front side member and the dash cross member in the vehicle width direction. The brace includes an extending portion. The extending portion is joined to the floor member.

6 Claims, 5 Drawing Sheets

(56) References Cited

FOREIGN PATENT DOCUMENTS

| | | | | |
|---|---|---|---|---|
| JP | 2018-122749 A | | 8/2018 | |
| JP | 2019137351 A | * | 8/2019 | ............... B60K 1/04 |
| JP | 2021-046166 A | | 3/2021 | |
| JP | 2021-062813 A | | 4/2021 | |
| WO | WO-2019198753 A1 | * | 10/2019 | ............... B60K 1/04 |

* cited by examiner

VEHICLE

CROSS-REFERENCE TO RELATED APPLICATION

This application claims priority to Japanese Patent Application No. 2021-146845 filed on Sep. 9, 2021, incorporated herein by reference in its entirety.

BACKGROUND

1. Technical Field

The technology disclosed herein relates to a vehicle.

2. Description of Related Art

A vehicle disclosed in Japanese Unexamined Patent Application Publication No. 2021-046166 (JP 2021-046166 A) includes a dash cross member extending along a vehicle width direction at the front end of a cabin. Rockers extending rearward from the dash cross member are connected to the right and left ends of the dash cross member. Front side members extending along a front-rear direction of the vehicle are arranged in front of the dash cross member. The rear end of each front side member is joined to the dash cross member. When a collision occurs at the front of the vehicle, a load is applied to the rockers from the front side members via the dash cross member. By transmitting the load in this way, deformation of the cabin is suppressed.

SUMMARY

When the load is applied from the front side member to the dash cross member, the dash cross member may be bent rearward at the joint with the front side member. When the dash cross member is bent in this way, the load cannot sufficiently be transmitted from the dash cross member to the rocker. This specification proposes a technology for suppressing the bending of the dash cross member.

A vehicle according to one aspect of the present disclosure includes a dash cross member, a front side member, a rocker, a floor member, and a brace. The dash cross member extends along a vehicle width direction. The front side member is arranged in front of the dash cross member, extends along a front-rear direction of the vehicle, and is joined to the dash cross member. The rocker extends rearward from the dash cross member. The floor member is arranged behind the dash cross member and defines a floor of a cabin. The brace is arranged behind the dash cross member, joined to the dash cross member, and joined to the floor member. A first joint overlaps a second joint in the vehicle width direction, the first joint being a joint between the brace and the dash cross member, and the second joint being a joint between the front side member and the dash cross member. The brace includes an extending portion extending rearward from the first joint. The extending portion is joined to the floor member.

In this vehicle, the brace connecting the dash cross member and the floor member is arranged behind the dash cross member. The first joint between the brace and the dash cross member overlaps the second joint between the front side member and the dash cross member in the vehicle width direction. Therefore, when a load is applied from the front side member to the dash cross member, the dash cross member is supported by the brace at a position where the load is applied. Thus, the bending of the dash cross member is suppressed. As a result, the load is easily transmitted from the front side member to the rocker via the dash cross member, and the deformation of the cabin can be suppressed.

In the vehicle according to the aspect described above, the first joint may overlap the second joint in a height direction.

In the vehicle according to the aspect described above, the dash cross member may include a first dash cross member and a second dash cross member arranged below the first dash cross member. The front side member may be joined to the first dash cross member and the second dash cross member. The brace may be joined to the first dash cross member and the second dash cross member.

In the vehicle according to the aspect described above, a joint between the extending portion and the floor member may overlap the first joint and the second joint in the vehicle width direction.

The vehicle according to the aspect described above may further include a connection panel portion connecting the first dash cross member and the second dash cross member. The front side member may include a tubular portion having a tubular shape extending along the front-rear direction of the vehicle, and an intermediate plate arranged inside the tubular portion and positioned away from an upper plate and a lower plate of the tubular portion. The intermediate plate may be joined to the connection panel portion.

In the vehicle according to the aspect described above, a battery pack may be arranged below the floor member.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In the exemplary vehicle disclosed herein, the first joint may overlap the second joint in a height direction.

According to this structure, the bending of the dash cross member can be suppressed more effectively.

In the exemplary vehicle disclosed herein, the dash cross member may include a first dash cross member and a second dash cross member arranged below the first dash cross member. The front side member may be joined to the first dash cross member and the second dash cross member. The brace may be joined to the first dash cross member and the second dash cross member.

According to this structure, the bending of each dash cross member can be suppressed.

The exemplary vehicle disclosed herein may further include a connection panel portion connecting the first dash cross member and the second dash cross member. The front side member may include a tubular portion having a tubular shape extending along the front-rear direction of the vehicle, and an intermediate plate arranged inside the tubular portion and positioned away from an upper plate and a lower plate of the tubular portion.

The intermediate plate may be joined to the connection panel portion.

According to this structure, the strength of the second joint can be improved.

In the exemplary vehicle disclosed herein, a battery pack may be arranged below the floor member.

According to this structure, the gap between the floor member and the battery pack can be reduced.

Figure 1:
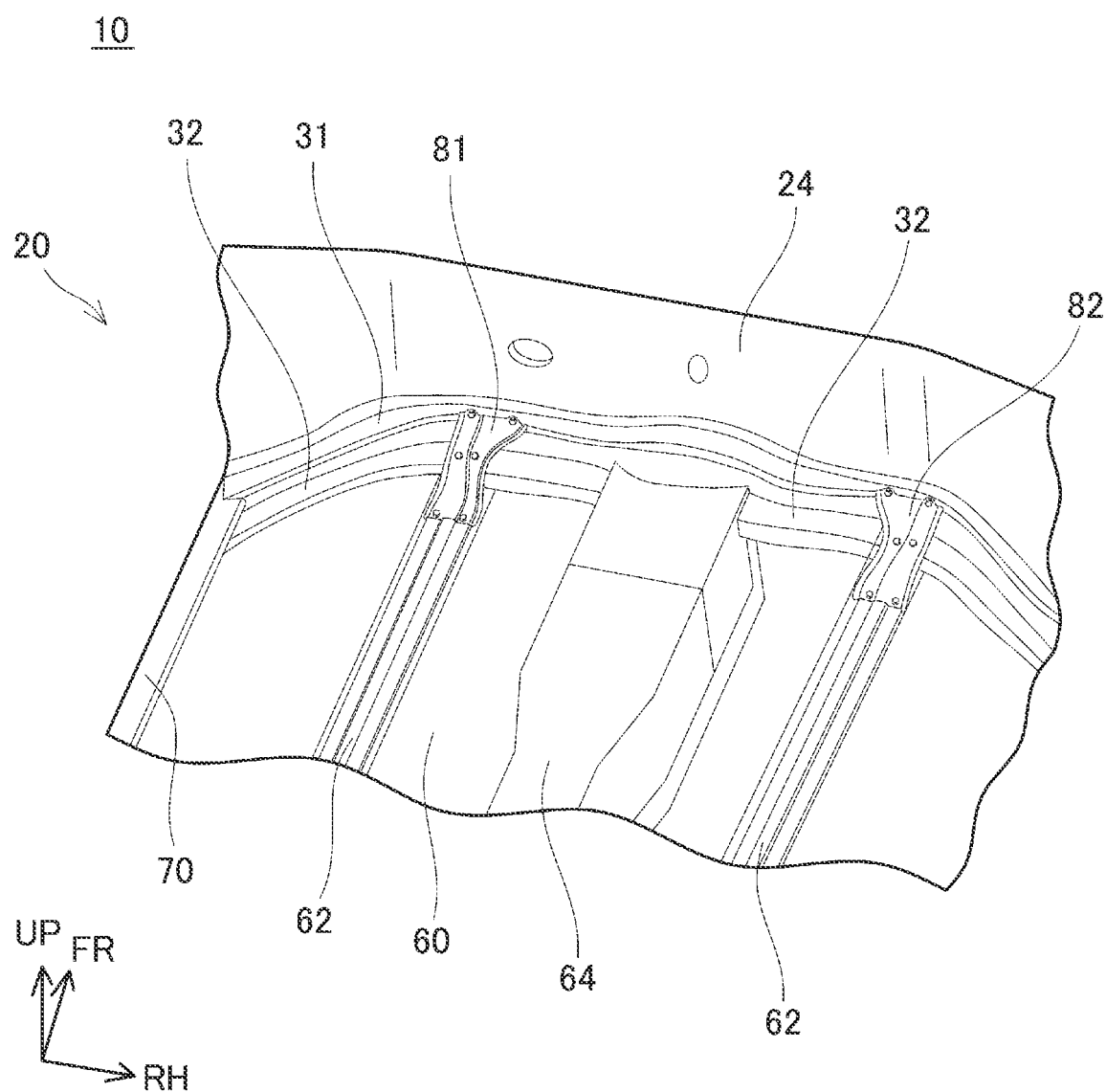
FIG. 1 is a perspective view of a front part of a cabin floor.
Figure 2:
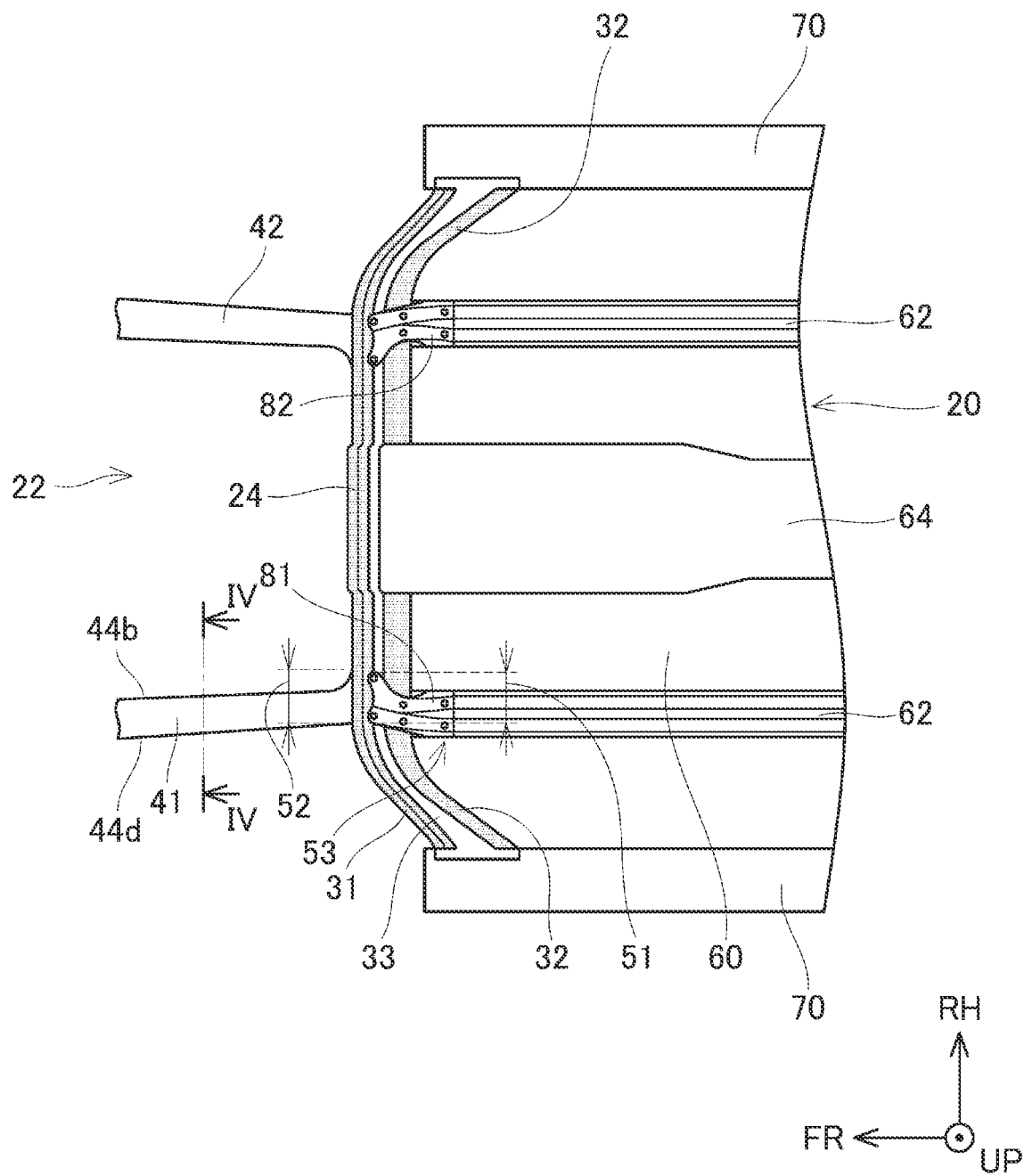
FIG. 2 is a plan view showing a vehicle skeleton around a dash cross member.

FIGS. 1 and 2 show a vehicle 10 of an embodiment. In the drawings, an arrow FR indicates a front side in a front-rear direction of the vehicle, an arrow RH indicates a right side in a lateral direction of the vehicle, and an arrow UP indicates an upper side in a vertical direction of the vehicle. The vehicle 10 of the embodiment includes a dash panel 24 at the front end of a cabin 20. As shown in FIG. 2, the dash panel 24 is placed between the cabin 20 and a front compartment 22 and defines the cabin 20 and the front compartment 22. The vehicle 10 is an electrified vehicle. Although illustration is omitted, the front compartment 22 includes a circuit such as an inverter that generates alternating current power to be supplied to a traveling motor.

Figure 3:
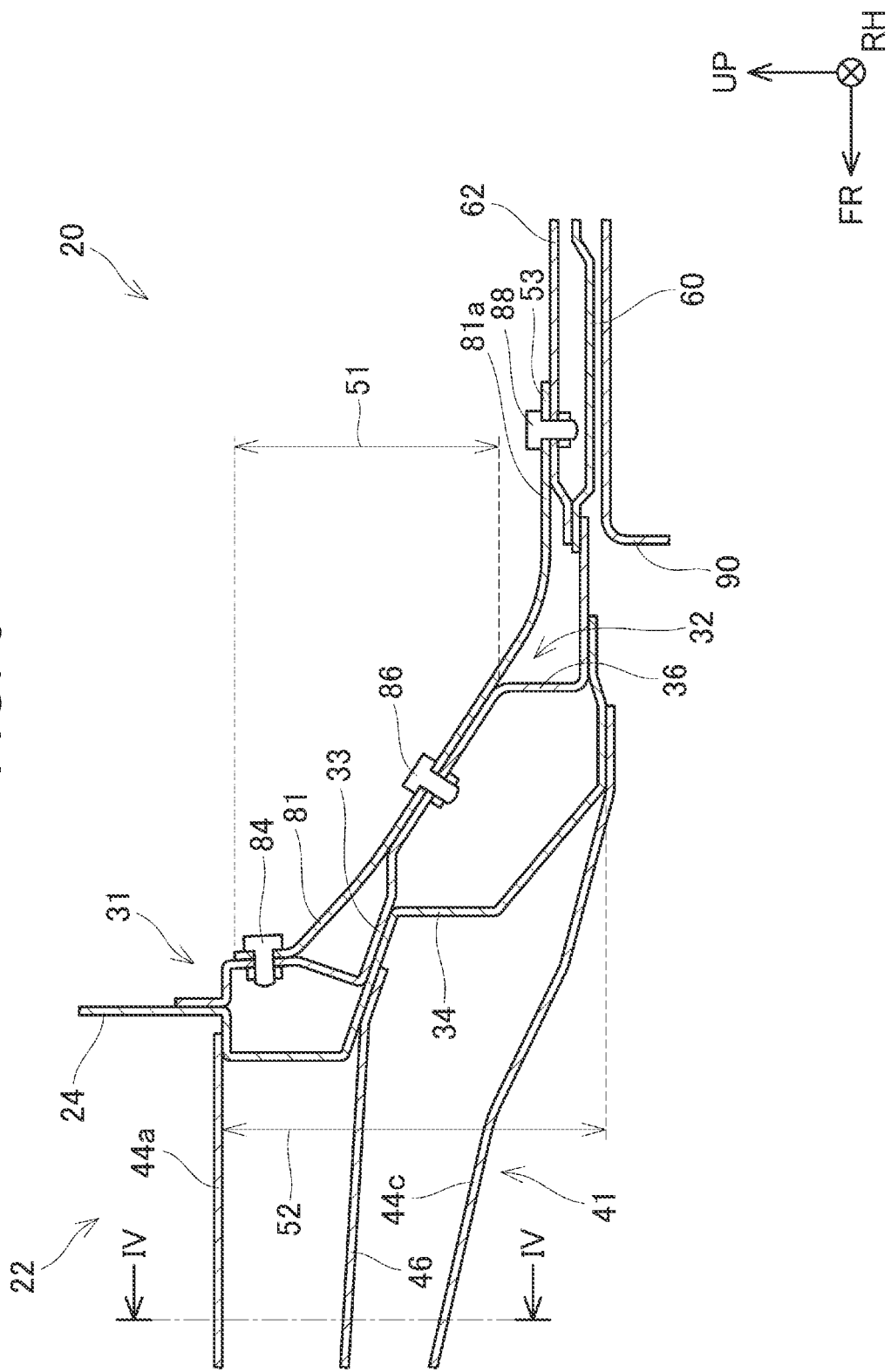
FIG. 3 is a vertical sectional view of a connection portion between a front side member and the dash cross member along a front-rear direction of the vehicle.

As shown in FIG. 1, a first dash cross member 31 and a second dash cross member 32 are arranged at a lower part of the dash panel 24. In other words, the first dash cross member 31 and the second dash cross member 32 are positioned at the front end of the cabin 20. As shown in FIG. 3, the first dash cross member 31 and the second dash cross member 32 are composed of two panels 34 and 36 (that is, metal plates). The panel 34 is continuous with the dash panel 24 and has many bent portions. The panel 36 has many bent portions and is welded to the panel 34 from the rear side. Tubular portions defined by the panels 34 and 36 serve as the first dash cross member 31 and the second dash cross member 32. In FIG. 2, the first dash cross member 31 and the second dash cross member 32 are hatched for clarity. As shown in FIG. 2, the first dash cross member 31 extends along a vehicle width direction. As shown in FIGS. 1 and 3, the second dash cross member 32 is arranged below the first dash cross member 31. As shown in FIG. 2, the second dash cross member 32 extends along the vehicle width direction. As shown in FIG. 3, a connection panel portion 33 connecting the first dash cross member 31 and the second dash cross member 32 is provided between the first dash cross member 31 and the second dash cross 15 member 32. The connection panel portion 33 is composed of the panels 34 and 36.

As shown in FIG. 2, two front side members 41 and 42 are arranged in front of the first dash cross member 31 and the second dash cross member 32. The front side members 41 and 42 extend along the front-rear direction of the vehicle. The two front side members 41 and 42 are arranged such that the two front side members 41 and 42 are spaced from each other in the vehicle width direction. The front side member 41 is arranged on a left side with respect to the center of the vehicle 10. The front side member 42 is arranged on a right side with respect to the center of the vehicle 10.

Figure 4:
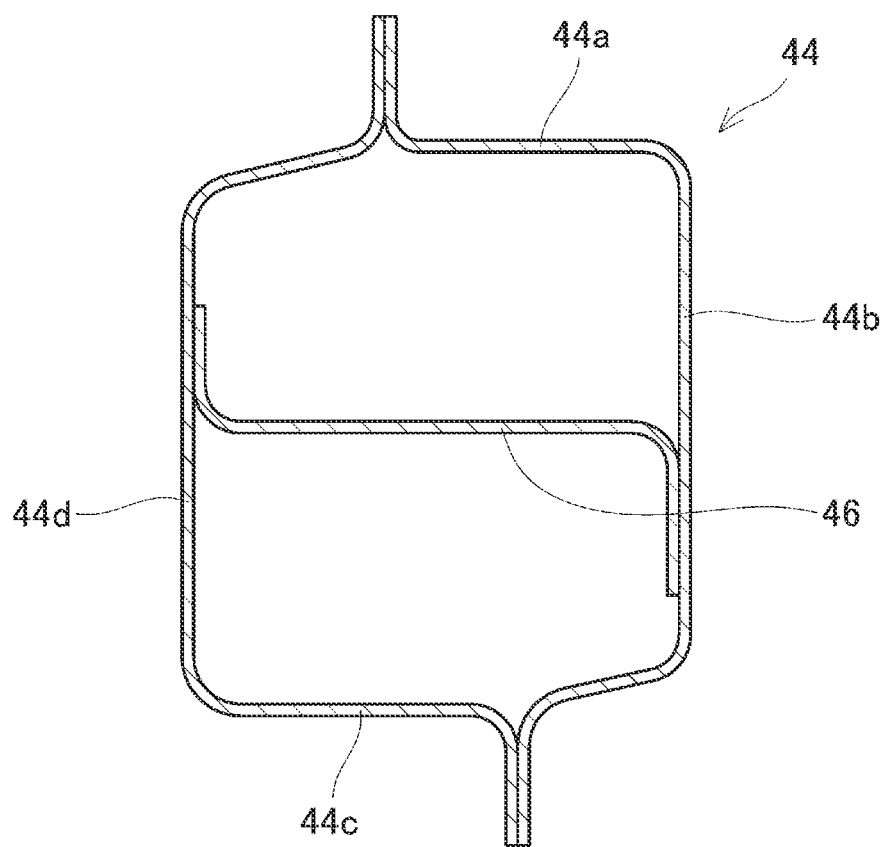
FIG. 4 is a vertical sectional view of the front side member along a line IV-IV in FIGS. 2 and 3.

As shown in FIG. 4, the front side member 41 includes a tubular portion 44 and an intermediate plate 46. The tubular portion 44 is formed by welding a plurality of metal plates. The tubular portion 44 has a tubular shape extending in the front-rear direction of the vehicle. A portion defining the upper surface of the tubular portion 44 is hereinafter referred to as "upper plate 44a". A portion defining the right side surface of the tubular portion 44 is hereinafter referred to as "right side plate 44b". A portion defining the lower surface of the tubular portion 44 is hereinafter referred to as "lower plate 44c". A portion defining the left side surface of the tubular portion 44 is hereinafter referred to as "left side plate 44d". The intermediate plate 46 is arranged inside the tubular portion 44. The intermediate plate 46 extends long in the front-rear direction of the vehicle along the tubular portion 44. The intermediate plate 46 is arranged at a position spaced from the upper plate 44a and the lower plate 44c. The intermediate plate 46 is welded to the right side plate 44b and the left side plate 44d.

As shown in FIGS. 2 and 3, the rear end of the front side member 41 is joined to the first dash cross member 31 and the second dash cross member 32 from the front side. More specifically, as shown in FIG. 3, the upper plate 44a of the tubular portion 44 is welded to the upper surface of the first dash cross member 31. The lower plate 44c of the tubular portion 44 is welded to the lower surface of the second dash cross member 32. The intermediate plate 46 is welded to the lower surface of the first dash cross member 31 and the connection panel portion 33. As shown in FIG. 2, the right side plate 44b and the left side plate 44d of the tubular portion 44 are welded to the front surface of the first dash cross member 31 and the front surface of the second dash cross member 32. The joint of the front side member 41 with the first dash cross member 31 and the second dash cross member 32 is hereinafter referred to as "second joint 52". In FIG. 3, the second joint 52 means a portion between the upper plate 44a and the lower plate 44c on the surfaces of the first dash cross member 31 and the second dash cross member 32. In FIG. 2, the second joint 52 means a portion between the right side plate 44b and the left side plate 44d on the surfaces of the first dash cross member 31 and the second dash cross member 32.

The front side member 42 has substantially the same structure as that of the front side member 41, and is joined to the first dash cross member 31 and the second dash cross member 32 in the same manner as that of the front side member 41.

As shown in FIGS. 1 to 3, a floor panel 60 and two floor frames 62 are arranged behind the first dash cross member 31 and the second dash cross member 32. The floor panel 60 and the two floor frames 62 are floor members constituting a floor of the cabin 20. The floor panel 60 serves substantially as the entire floor of the cabin 20. As shown in FIG. 3, the front end of the floor panel 60 is welded to the panel 36 defining the second dash cross member 32. The floor panel 60 extends rearward from the second dash cross member 32. The two floor frames 62 are arranged on the floor panel 60. Each floor frame 62 extends long along the front-rear direction of the vehicle. The floor frames 62 are arranged such that the floor frames 62 are spaced from each other in the vehicle width direction. As shown in FIG. 2, the left floor frame 62 is arranged directly behind the front side member 41, and the right floor frame 62 is arranged directly behind the front side member 42. Each floor frame 62 is welded to the floor panel 60 to reinforce the floor panel 60. A floor tunnel 64 extending in the front-rear direction along the center of the vehicle 10 is provided between the two floor frames 62.

As shown in FIGS. 1 and 2, rockers 70 are arranged on both side edges of the vehicle 10. Each rocker 70 extends along the front-rear direction of the vehicle. The rockers 70 are welded to the right and left edges of the floor panel 60. The front end of the left rocker 70 is welded to the left ends of the first dash cross member 31 and the second dash cross member 32. The front end of the right rocker 70 is welded to the right ends of the first dash cross member 31 and the second dash cross member 32.

As shown in FIGS. 1 and 2, two braces 81 and 82 are arranged in the cabin 20. The braces 81 and 82 are arranged such that the braces 81 and 82 are spaced from each other in the vehicle width direction. The brace 81 is arranged on the left side with respect to the center of the vehicle 10. The brace 82 is arranged on the right side with respect to the center of the vehicle 10.

Figure 5:
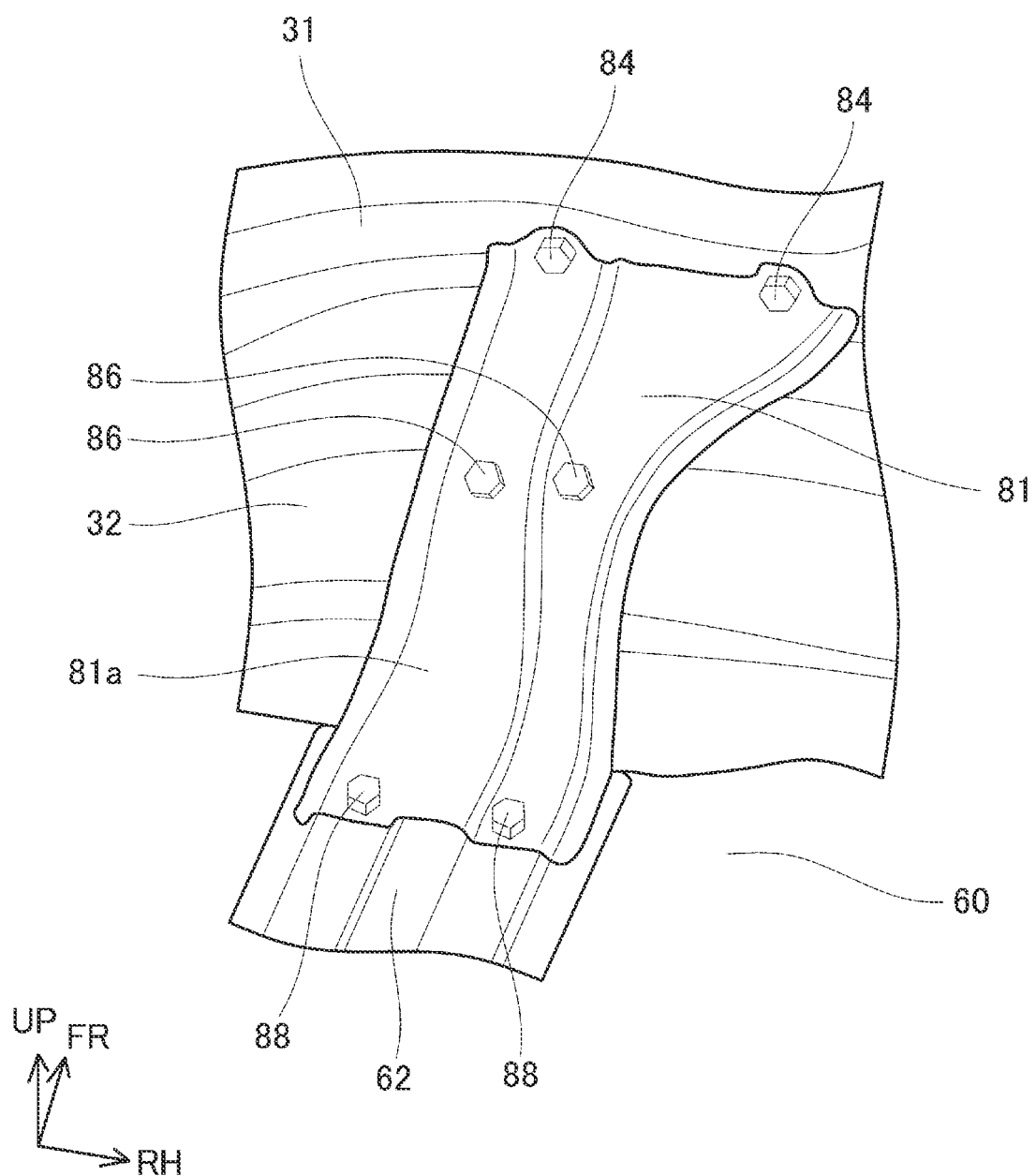
FIG. 5 is a perspective view of a brace.

As shown in FIG. 5, the brace 81 has an elongated shape in the front-rear direction of the vehicle. The brace 81 extends obliquely rearward and downward from a position where the brace 81 is in contact with the first dash cross member 31. As shown in FIG. 3, the brace 81 is in contact with the rear surface of the first dash cross member 31, the upper surface of the second dash cross member 32, and the upper surface of the floor frame 62. As shown in FIGS. 3 and 5, the brace 81 is joined to the rear surface of the first dash cross member 31 (that is, the panel 36) with two bolts 84. The brace 81 is also joined to the upper surface of the second dash cross member 32 (that is, the panel 36) with two bolts 86. The brace 81 includes an extending portion 81a extending rearward from the joint defined by the bolts 84 and 86. The extending portion 81a extends to an upper part of the floor frame 62. The extending portion 81a is joined to the floor frame 62 with two bolts 88. The joint of the brace 81 with the first dash cross member 31 and the second dash cross member 32 is hereinafter referred to as "first joint 51". The first joint 51 means a portion in contact with the brace 81 on the surfaces of the first dash cross member 31 and the second dash cross member 32. The joint of the brace 81 with the floor frame 62 is hereinafter referred to as "third joint 53". The third joint 53 means a portion in contact with the brace 81 on the surface of the floor frame 62.

When viewed from the top as shown in FIG. 2, the second joint 52 (that is, the joint of the front side member 41 with the first dash cross member 31 and the second dash cross member 32) overlaps the first joint 51 (that is, the joint of the brace 81 with the first dash cross member 31 and the second dash cross member 32) in the vehicle width direction. When viewed along the vehicle width direction as shown in FIG. 3, the second joint 52 overlaps the first joint 51 in the vertical direction. That is, the first joint 51 is arranged directly behind the second joint 52. The extending portion 81a of the brace 81 extends directly rearward from the first joint 51. Therefore, when viewed from the top as shown in FIG. 2, the third joint 53 (that is, the joint of the extending portion 81a with the floor frame 62) overlaps the first joint 51 and the second joint 52 in the vehicle width direction. The brace 81 reinforces the first dash cross member 31 and the second dash cross member 32.

The brace 82 has substantially the same structure as that of the brace 81, and is joined to the first dash cross member 31, the second dash cross member 32, and the right floor frame 62 in the same manner as that of the brace 81.

As shown in FIG. 3, a battery case 90 (in other words, a battery pack) is arranged below the floor panel 60. The battery case 90 houses one or more battery cells for supplying electric power to the motor. As described above, in the vehicle 10, the brace 81 and the floor frame 62 serving as reinforcing members are arranged above the floor panel 60. Therefore, few reinforcing members are arranged below the floor panel 60. Thus, the gap between the battery case 90 and the floor panel 60 can be reduced. By reducing the number of reinforcing members below the floor panel 60, the space below the floor panel 60 can be used effectively.

When a collision occurs at the front of the vehicle 10, a load is applied rearward to the front side members 41 and 42. The load applied to the front side member 41 is transmitted to the first dash cross member 31 and the second dash cross member 32 at the second joint 52. When the first dash cross member 31 and the second dash cross member 32 are bent at the second joint 52 due to the load, deformation of the cabin 20 increases. In the vehicle 10 of the embodiment, the brace 81 is provided directly behind the second joint 52. When viewed from the top as shown in FIG. 2, the brace 81 extends from the first joint 51 provided directly behind the second joint 52 to the third joint 53 provided directly behind the second joint 52. Therefore, the brace 81 can appropriately receive the load applied to the second joint 52 from the front side member 41. As a result, the bending of the first dash cross member 31 and the second dash cross member 32 is suppressed at the second joint 52. Thus, the load applied to the front side member 41 is suitably transmitted to the left rocker 70 via the first dash cross member 31 and the second dash cross member 32. The brace 82 suppresses the bending of the first dash cross member 31 and the second dash cross member 32 in the same manner as that of the brace 81. Thus, the load applied to the front side member 42 is suitably transmitted to the right rocker 70 via the first dash cross member 31 and the second dash cross member 32. Since the load is suitably transmitted from the first dash cross member 31 and the second dash cross member 32 to the right and left rockers 70, the deformation of the cabin 20 can be suppressed.

In the vehicle 10, the intermediate plate 46 of the front side member 41 is welded to the connection panel portion 33 at the second joint 52. As a result, the second joint 52 is reinforced. Thus, the bending of the first dash cross member 31 and the second dash cross member 32 is suppressed more effectively at the second joint 52.

The vehicle 10 of the embodiment described above includes the first dash cross member 31 and the second dash cross member 32. In other embodiments, one dash cross member may be provided alone.

Although the embodiment is described in detail above, the embodiment is merely illustrative and is not intended to limit the scope of the claims. The technology described in the claims includes various modifications and alterations of the specific examples described above. The technical elements described herein or illustrated in the drawings exhibit technical utility solely or in various combinations, and are not limited to the combination described in the claims as filed. The technologies described herein or illustrated in the drawings may simultaneously achieve a plurality of objects, and exhibit technical utility by achieving one of the objects.

What is claimed is:

1. A vehicle comprising:
  a dash cross member extending along a vehicle width direction;
  a front side member arranged in front of the dash cross member, extending along a front-rear direction of the vehicle, and joined to the dash cross member;
  a rocker extending rearward from the dash cross member;
  a floor member arranged behind the dash cross member and defining a floor of a cabin; and
  a brace arranged behind the dash cross member, joined to the dash cross member, and joined to the floor member, wherein:
  a first joint overlaps a second joint in the vehicle width direction, the first joint being a joint between the brace and the dash cross member, and the second joint being a joint between the front side member and the dash cross member;

the brace includes an extending portion extending rearward from the first joint; and the extending portion is joined to the floor member.

2. The vehicle according to claim 1, wherein the first joint overlaps the second joint in a height direction.

3. The vehicle according to claim 1, wherein:

the dash cross member includes a first dash cross member and a second dash cross member arranged below the first dash cross member;

the front side member is joined to the first dash cross member and the second dash cross member; and the brace is joined to the first dash cross member and the second dash cross member.

4. The vehicle according to claim 1, wherein a joint between the extending portion and the floor member overlaps the first joint and the second joint in the vehicle width direction.

5. The vehicle according to claim 3, further comprising a connection panel portion connecting the first dash cross member and the second dash cross member, wherein:

the front side member includes a tubular portion having a tubular shape extending along the front-rear direction of the vehicle, and an intermediate plate arranged inside the tubular portion and positioned away from an upper plate and a lower plate of the tubular portion; and the intermediate plate is joined to the connection panel portion.

6. The vehicle according to claim 1, wherein a battery pack is arranged below the floor member.

* * * * *